US008617457B2

(12) United States Patent
Powell et al.

(10) Patent No.: US 8,617,457 B2
(45) Date of Patent: Dec. 31, 2013

(54) APPARATUS AND METHOD FOR CONDENSING METAL VAPOR

(75) Inventors: Adam Clayton Powell, Newton, MA (US); Soobhankar Pati, Boston, MA (US); Jason Douglas, Prospect, KY (US); Stephen J. Derezinski, III, Wellesley, MA (US); Luciano Spiridigliozzi, North Reading, MA (US); Michael Buchman, Boston, MA (US); Thomas Eagar, Belmont, MA (US)

(73) Assignee: Infinium, Inc., Natick, MA (US)

( * ) Notice: Subject to any disclaimer, the term of this patent is extended or adjusted under 35 U.S.C. 154(b) by 0 days.

(21) Appl. No.: 13/543,575

(22) Filed: Jul. 6, 2012

(65) Prior Publication Data

US 2013/0145902 A1 Jun. 13, 2013

Related U.S. Application Data

(60) Provisional application No. 61/505,958, filed on Jul. 8, 2011.

(51) Int. Cl.
*F28B 9/08* (2006.01)
*B01D 5/00* (2006.01)
*C21D 11/00* (2006.01)
*C22B 9/02* (2006.01)

(52) U.S. Cl.
USPC ................. 266/80; 266/85; 266/90; 266/148; 266/154; 266/218

(58) Field of Classification Search
USPC ........................ 266/148, 154, 85, 80, 90, 218
See application file for complete search history.

(56) References Cited

U.S. PATENT DOCUMENTS 2,029,921 A * 2/1936 Hansgirg ...................... 266/149
2,387,677 A 10/1945 Pidgeon (Continued)

FOREIGN PATENT DOCUMENTS

WO WO-03/048398 A1 6/2003

OTHER PUBLICATIONS

International Search Report and Written Opinion issued for PCT/US2012/045790, dated Oct. 16, 2012 (12 pages).

(Continued)

*Primary Examiner* — George Wyszomierski
*Assistant Examiner* — Tina M McGuthry Banks
(74) *Attorney, Agent, or Firm* — Wilmer Cutler Pickering Hale and Dorr LLP

(57) ABSTRACT

An apparatus for condensing metal vapors has at least one inlet conduit that is cooled to cause a portion of the metal vapor to condense to liquid. The apparatus also has a holding tank that is connected to the inlet conduit that collects condensed liquid metal. The apparatus also has at least one outlet conduit connected to the holding tank that is cooled to cause a portion of the remaining metal vapor to condense to solid metal. The apparatus also has at least one heater that heats the at least one outlet conduit to cause the solid metal to melt to liquid metal and subsequently flow in to the holding tank. The apparatus also has at least one sealing mechanism located at a distal end of the at least one outlet conduit for preventing metal vapor and carrier gas from exiting the outlet conduit during heating of the outlet conduit.

32 Claims, 7 Drawing Sheets

(56) References Cited

U.S. PATENT DOCUMENTS

| | | | |
|---|---|---|---|
| 2,514,275 | A | 7/1950 | Allen |
| 2,634,969 | A | 4/1953 | Hansgirg |
| 2,837,328 | A | 6/1958 | Pidgeon |
| 2,971,833 | A | 2/1961 | Artru et al. |
| 3,505,063 | A | 4/1970 | Schmidt |
| 4,190,434 | A | 2/1980 | Bonfils et al. |
| 5,090,996 | A | 2/1992 | Cameron |
| 5,383,953 | A | 1/1995 | Christini |
| 5,976,354 | A | 11/1999 | Powers et al. |
| 6,299,742 | B1 | 10/2001 | Pal et al. |
| 6,533,990 | B2 | 3/2003 | Popov et al. |
| 6,838,045 | B2 | 1/2005 | Tayama et al. |
| 7,641,711 | B2 | 1/2010 | Schoukens et al. |

OTHER PUBLICATIONS

Krishnan, A. et al., "Solid Oxide Membrane Process for Magnesium Production directly from Magnesium Oxide," Metall. Mater. Trans. 36B, pp. 463-473, 2005.

* cited by examiner

APPARATUS AND METHOD FOR CONDENSING METAL VAPOR

CROSS-REFERENCE TO RELATED APPLICATIONS

This application claims the benefit under 35 U.S.C. §119 (e) to U.S. Provisional Patent Application No. 61/505,958, entitled Method and Apparatus for Condensing Liquid Magnesium and Other Volatile Metals from Low-Pressure Metal Vapor, filed on Jul. 8, 2011, the contents of which are incorporated in its entirety by reference herein.

BACKGROUND OF THE INVENTION

1. Field of the Invention

The invention generally relates to recovering metallic species in a vapor state, and, more specifically, to condensing vapors of metals to achieve relatively high recovery of the same.

2. Description of Related Art

Magnesium is the lowest-density engineering metal, with alloys exhibiting outstanding specific stiffness and strength. It exhibits a relatively low boiling point among metals, such that several processes produce it as a vapor, which enables in-line distillation. However, it also exhibits the highest vapor pressure at its melting point of all metals: nearly 2 torr. This makes it difficult to condense magnesium vapor as a liquid, because even with perfect mass transfer, significant magnesium remains in the vapor phase at its melting point, so one must control temperature very carefully to avoid either leaving significant magnesium in the vapor phase or producing solid metal particles. A liquid metal product is advantageous over solid product because it is much easier to remove a liquid from the process and cast it into ingots or parts, alloy it with other metals, or form other useful products than would be the case for solids.

Condenser apparatus such as those of Allen (U.S. Pat. No. 2,514,275) and Pidgeon (U.S. Pat. No. 2,837,328), which have been the norm in the magnesium industry for decades, produce only solid magnesium. A liquid magnesium condenser by Schmidt (U.S. Pat. No. 3,505,063) produces magnesium-aluminum alloys which are suitable for aluminum alloy production, but do not contain sufficient magnesium for magnesium-base alloys.

A device by Schoukens et al. (U.S. Pat. No. 7,641,711) condenses liquid magnesium from vapor with magnesium partial pressure of 0.7-1.2 atmospheres (70-120 kPa). This device recovers magnesium as a liquid for processes such as the Magnatherm metallothermic magnesium reduction technology (see U.S. Pat. Nos. 2,971,833 and 4,190,434), which can produce magnesium at that pressure. However, at the high temperature over 1800° C. required for metallothermic production near atmospheric pressure (see U.S. Pat. Nos. 5,090,996 and 5,383,953), other elements such as manganese, iron, nickel and copper are volatile and can enter the magnesium product as impurities. And Schoukens' condenser is not as effective when input magnesium partial pressure is below 0.7 atmospheres (70 kPa), e.g. the Pidgeon process (see U.S. Pat. No. 2,387,677) and similar low-pressure metallothermic reduction processes. Schmidt's patent (U.S. Pat. No. 3,505,063) gives another reason for difficulty in producing liquid magnesium from a metallothermic reduction vapor stream, which is the variable or "pulsed" rate of magnesium entry into the condenser and its vapor pressure, making it very difficult to control condenser temperature tightly enough to reliably produce liquid magnesium.

The Solid Oxide Membrane ("SOM") electrolysis process (see U.S. Pat. Nos. 5,976,354 and 6,299,742) shown in FIG. 1 efficiently produces pure oxygen gas and metals from metal oxides. When producing magnesium by SOM electrolysis (see, e.g., A. Krishnan, X. G. Lu and U. B. Pal, "Solid Oxide Membrane Process for Magnesium Production directly from Magnesium Oxide," *Metall. Mater. Trans.* 36B:463, 2005), it is convenient to operate the electrolysis cell above the 1090° C. boiling point of magnesium, as operating at this temperature promotes high ionic conductivity of the zirconia SOM and purifies the magnesium product by distillation (as shown in FIG. 1). Unfortunately, when the magnesium product partial pressure is above a threshold, it reacts with and damages the zirconia SOM; that threshold equilibrium magnesium partial pressure is approximately 0.15 atm at 1150° C. and 0.33 atm at 1300° C. (15 and 33 kPa respectively). Unlike metallothermic reduction, in SOM Electrolysis the electric current determines the rate of magnesium production. And because it is easier to control the current in SOM electrolysis than the reaction rate in metallothermic processes, there is far less fluctuation in magnesium partial pressure and temperature at the condenser. This facilitates (but is not necessary for) operating a liquid condenser for this process, at whose magnesium partial pressure the condenser of Schoukens et al. is not effective as mentioned above. On the other hand, it is difficult to shut down and restart a self-heated electrolysis cell, such as SOM electrolysis of magnesium, due to salt freezing and other phenomena. Thus it is important for a magnesium condenser for this process to be able to operate continuously without periodically shutting off.

BRIEF SUMMARY OF THE INVENTION

In one aspect of the invention, an apparatus and method for condensing metal vapor is disclosed.

In another aspect of the invention, an apparatus for condensing metal vapors includes at least one inlet conduit for receiving a mixture of metal vapor and carrier gas and a holding tank operatively connected to the at least one inlet conduit for receiving the mixture of metal vapor and carrier gas from the at least one inlet conduit. The apparatus also includes at least one outlet conduit operatively connected to the holding tank for receiving the mixture of metal vapor and carrier gas from the holding tank and at least a first cooling device operatively connected to the at least one outlet conduit to cause at least a portion of the metal vapor entering the at least one outlet conduit to condense to solid metal. The apparatus further includes at least one heater operatively connected to the at least one outlet conduit for causing at least a portion of the solid metal to melt and subsequently flow in to the holding tank and at least one sealing mechanism located at a distal end of the at least one outlet conduit for sealing the distal end of the at least one outlet conduit and preventing remaining metal vapor and carrier gas from exiting the distal end of the outlet conduit when the outlet conduit is being heated.

In a further aspect of the invention, an apparatus for condensing metal vapors includes at least one inlet conduit for receiving a mixture of metal vapor and carrier gas and a holding tank operatively connected to the at least one inlet conduit for receiving the mixture of metal vapor and carrier gas from the at least one inlet conduit. The apparatus also includes at least one outlet conduit operatively connected to the holding tank for receiving the mixture of metal vapor and gas from the holding tank. The at least one outlet conduit has a proximal end located proximal to the holding tank and a distal end located distal to the holding tank. The at least one outlet conduit has a plurality of sections. The apparatus further includes a plurality of cooling devices operatively connected to the corresponding plurality of sections of the at least one outlet conduit to cause some of the metal vapor inside the corresponding section of the at least one outlet conduit to condense to solid metal and a plurality of heaters operatively connected to the corresponding plurality of sections of the at least one outlet conduit to cause the solid metal within the corresponding section of the at least one outlet conduit to melt. The apparatus also includes a controller for controlling the plurality of cooling devices and the plurality of heaters. The controller causes (1) a first cooling device of the plurality operatively connected to a first section of the at least one outlet conduit to cool and condense the metal vapor inside the first section of the at least one outlet conduit to solid metal, (2) subsequent to the operation of the first cooling device, a first heater of the plurality operatively connected to the first section of the at least one outlet conduit to heat and melt the solid metal inside the first section of the at least one outlet conduit, (3) a second cooling device of the plurality operatively connected to a second section of the at least one outlet conduit to cool and condense the metal vapor inside the second section of the at least one outlet conduit to solid metal, and (4) subsequent to the operations of the second cooling device, a second heater of the plurality operatively connected to the second section of the at least one outlet conduit to heat and melt the solid metal inside the second section of the at least one outlet conduit.

In still another aspect of the invention, an apparatus for condensing metal vapors includes at least one inlet conduit for receiving a mixture of metal vapor and carrier gas and a holding tank operatively connected to the at least one inlet conduit for receiving the mixture of metal vapor and carrier gas from the at least one inlet conduit. The apparatus also includes at least one outlet conduit operatively connected to the holding tank for receiving the mixture of metal vapor and carrier gas from the holding tank, at least a first cooling device operatively connected to the at least one outlet conduit to cause at least a portion of the metal vapor entering the at least one outlet conduit to condense to solid metal, and at least one mechanical device positioned inside the at least one outlet conduit that operates to push the solid metal from the at least one outlet conduit to the holding tank.

In yet a further aspect of the invention, an apparatus for condensing metal vapors includes at least one inlet conduit for receiving a mixture of metal vapor and carrier gas, a holding tank operatively connected to the at least one inlet conduit for receiving the metal vapor and carrier gas from the at least one inlet conduit, and at least one set of outlet conduits operatively connected to the holding tank for receiving the metal vapor and gas mixture from the holding tank. Each outlet conduit of the set has a shared input section and a shared output section, and each outlet conduit of the set has an individual output section. The apparatus also includes a set of cooling devices. Each cooling device is operatively connected to a corresponding outlet conduit to cause some of the metal vapor inside the outlet conduit to condense to solid metal. The apparatus further includes a set of heaters. Each heater being operatively connected to a corresponding outlet conduit to cause the solid metal inside the outlet conduit to melt. The apparatus also includes a plurality of valves operatively connected to the set of outlet conduits and a controller for controlling the set of cooling devices, the set of heaters, and the plurality of valves to cause the metal vapor and gas mixture to pass from the shared input section through the set of outlet conduits in parallel to the shared output section when each of the set of cooling devices is condensing solid metal in each of the corresponding outlet conduits, and to cause the metal vapor and gas mixture to pass from the shared input section through the set of outlet conduits in series to the individual output section of an outlet conduit of the set in which a corresponding cooling device is condensing solid metal when a heating device of the set is melting solid metal in the other outlet conduit of the set.

In another aspect of the invention, a method for condensing metal vapors includes directing a mixture of metal vapor and carrier gas in to at least one inlet conduit, directing the mixture of metal vapor and carrier gas in to a holding tank and subsequently in to at least one outlet conduit operatively connected to the holding tank, and cooling the at least one outlet conduit to cause some of the metal vapor inside the at least one outlet conduit to condense to solid metal. The method further includes, subsequent to condensing solid metal, stopping the cooling of at least one of the outlet conduits and commencing heating of the same outlet conduits to cause the solid metal to melt to form liquid metal, collecting the liquid metal in the holding tank, and preventing the remaining metal vapor and carrier gas from exiting the same outlet conduits during at least a portion of the heating of the same outlet conduits.

In still a further aspect of the invention, a method for condensing metal vapors includes directing a mixture of metal vapor and carrier gas in to at least one inlet conduit and directing the mixture of metal vapor and carrier gas in to a holding tank and subsequently in to at least one outlet conduit operatively connected to the holding tank. The at least one outlet conduit has a plurality of sections, and the first section is proximal to the holding tank. The method further includes cooling the first section of the at least one outlet conduit to cause some of the metal vapor inside the first section of the at least one outlet conduit to condense to solid metal, and, subsequent to condensing solid metal in the first section of the at least one outlet conduit, stopping the cooling of the first section of the at least one outlet conduit and commencing heating of the first section of the at least one outlet conduit to cause the solid metal to melt to form liquid metal. The method also includes cooling a second section of the at least one outlet conduit. The second section is distal to the first section of the at least one outlet conduit, to cause some of the metal vapor inside the second section of the at least one outlet conduit to condense to solid metal. The method also includes, subsequent to condensing solid metal in the second section of the at least one outlet conduit, stopping the cooling of the second section of the at least one outlet conduit and commencing heating of the second section of the at least one outlet conduit to cause the solid metal to melt to form liquid metal, collecting the liquid metal in the holding tank, and preventing the metal vapor and carrier gas from exiting the at least one outlet conduit during at least a portion of the heating of a distal-most section of the at least one outlet conduit.

In yet another aspect of the invention, a method for condensing metal vapors includes directing a mixture of metal vapor and carrier gas in to at least one inlet conduit, directing the mixture of metal vapor and carrier gas in to a holding tank and subsequently in to at least one outlet conduit operatively connected to the holding tank. The method also includes cooling the at least one outlet conduit to cause some of the remaining metal vapor inside the at least one outlet conduit to condense to solid metal, and pushing the solid metal out of the at least one outlet conduit in to the holding tank.

DETAILED DESCRIPTION OF THE INVENTION

This disclosure describes methods and apparatuses for condensing liquid magnesium or other liquid metals or other species from the vapor state. Certain embodiments condense vapors with a with partial pressure between 100 Pa and 70 kPa and recover over 95% of the input metal vapor in the liquid product. The embodiments are useful for producing liquid magnesium in combination with SOM Electrolysis, metallothermic reduction, distillation, and similar processes where it is necessary or convenient to form metal at low vapor pressure.

Figure 1:
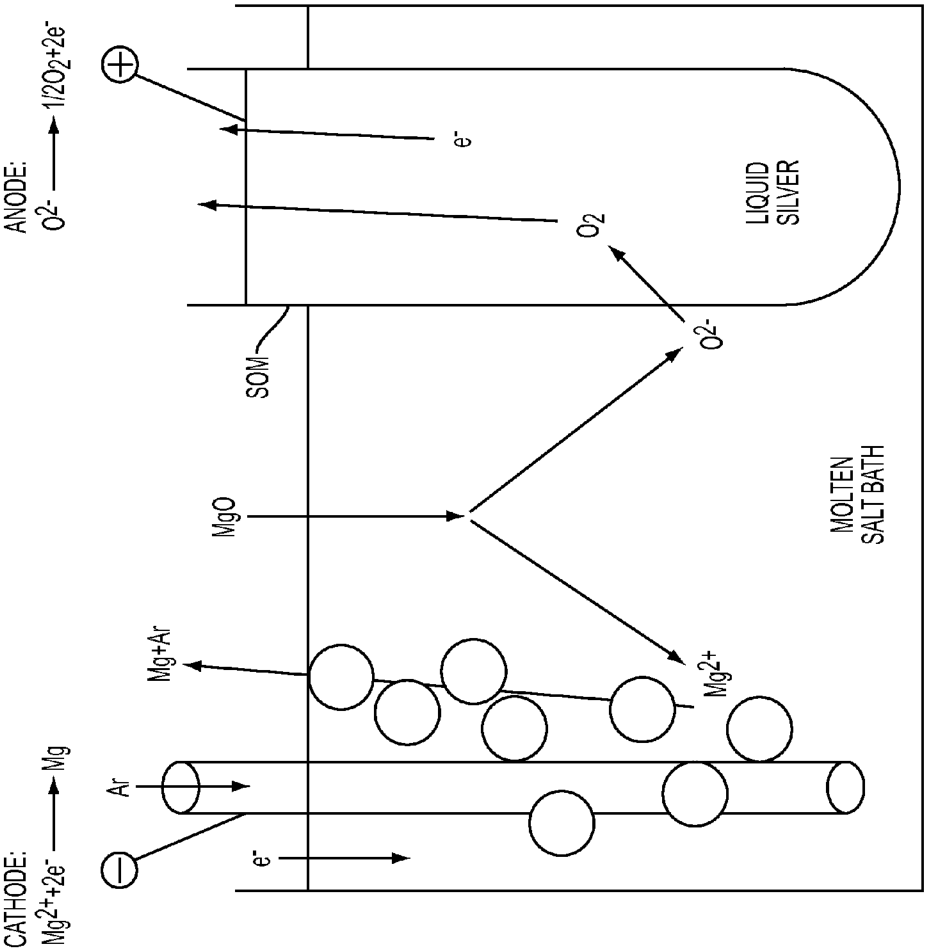
PRIOR ART FIG. 1
FIG. 1 is a schematic of a SOM electrolysis process for producing magnesium vapor.

FIG. 1 shows a schematic of an exemplary SOM electrolysis process and apparatus for obtaining pure magnesium metal from magnesium oxide (MgO). Magnesium oxide is heated in a molten salt bath and electrolyzed to form pure magnesium gas and pure oxygen gas. At the cathode of the exemplary apparatus, magnesium ions are reduced to form pure gaseous magnesium, which bubbles out of the molten salt bath. At the anode of the exemplary apparatus, oxygen anions are permitted to permeate a SOM membrane into liquid silver, where the oxygen anions are oxidized to pure oxygen gas, which bubbles out of the apparatus. Thus, the SOM apparatus shown in FIG. 1 can be a source of metal vapor, e.g., magnesium vapor. Other sources of metal vapor are also within the scope of the invention.

Figure 2:
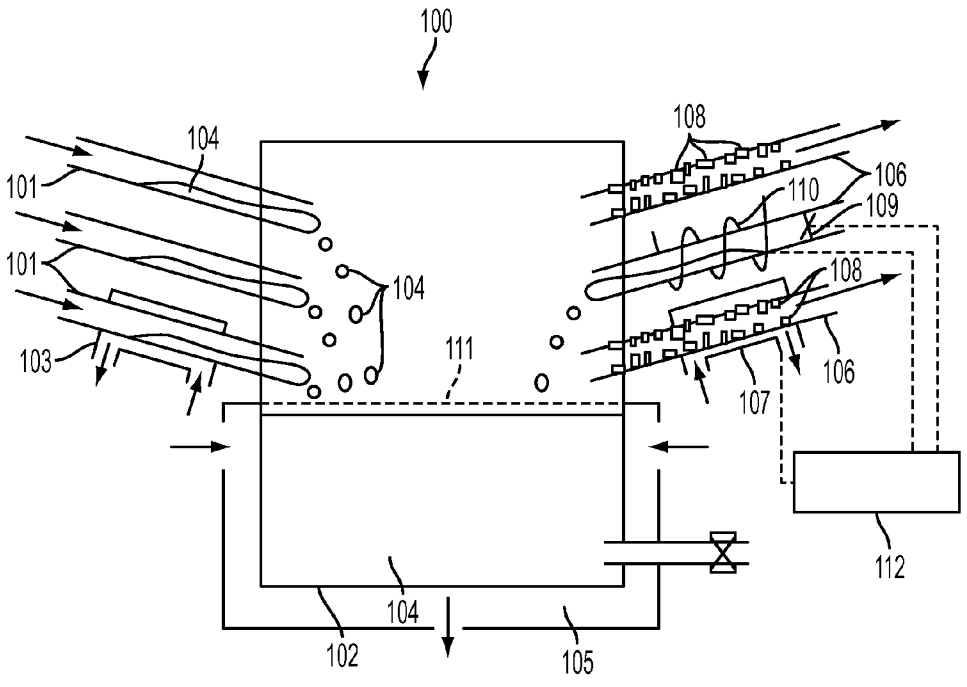
FIG. 2 is a schematic of a condenser according to a first embodiment of the invention.

FIG. 2 illustrates a condenser system 100, which includes two condensing stages. The condenser system 100 includes a first condenser tube, conduit, or set of tubes or conduits (hereafter "inlet tube(s)") 101 that carries the metal vapor from, e.g., a SOM electrolysis cell, with a carrier gas, illustratively argon, to a tank 102. The tube/conduit walls are cooled by a fluid jacket 103, illustratively with air or water as the cooling fluid, reducing the gas temperature from the entrance temperature to a temperature close to but not below the metal's melting point (m.p.), e.g., m.p.≤T≤m.p.+100° C. This range is illustrative; other values outside of this range are also within the scope of the invention. In addition, the use of a fluid jacket for cooling is but one illustrative example of how the conduit can be cooled. Other known chillers can be used and remain within the scope of the invention. As the gas temperature falls below the metal dew point (i.e. the temperature at which the metal equilibrium vapor pressure equals its partial pressure in the gas), then this condenses some of the metal in the vapor to a liquid 104 in the tube(s) 101. The tube(s) 101 slope downward or descend vertically into the liquid metal tank 102 such that condensed liquid metal 104 in the tube(s) 101 flows into the tank 102.

The holding tank 102 contains the condensed liquid metal 104, and the metal-bearing gas flows through this holding tank 102 past the condensed liquid metal 104. The tank 102 is heated or cooled by an electric or gas heater or one or more fluid jacket(s) 105 to keep its temperature uniform and above though close to the metal's melting point, e.g., m.p.≤T≤m.p.+50° C. This range is illustrative; other values outside of this range are also within the scope of the invention.

A second condenser tube, conduit, or set of tubes or conduits (hereafter "outlet tube(s)") 106 leads the carrier gas-metal vapor mixture away from the tank 102. The tube walls are cooled by a fluid jacket 107 and cool the gas to well below metal's melting point, condensing nearly all of the remaining metal as solids 108. Mechanical action (physically pushing solid metal deposits out of the outlet tubes, e.g., into the liquid tank) and/or periodic remelting (periodically shutting off flow through one or more of the tubes, and heating it above the condensed metal melting point to melt the solid metal deposits) drives this metal into the holding tank 102. A gas flow cutoff valve 109 located at the distal end of the outlet tube(s) 106 can be closed when an outlet tube 106 is being reheated to prevent metal vapor that results from the heating process from escaping the outlet tube 106.

One can heat the outlet tube(s) 106 to remelt the solid condensate 108 by electrical resistive heating elements 110, by electromagnetic induction heating, by combustion flame, or by flowing hot fluid through a fluid jacket around it. This hot fluid can be hot fluid that is leaving fluid jacket 103 around the inlet tube(s) 101 that is subsequently diverted to the outlet tube(s) 106 to heat the outlet tube(s) 106. For a magnesium condenser, the inlet tube(s) 101, holding tank 102 and outlet tube(s) 106 can illustratively be made of carbon steel, nickel-free stainless steel alloys, carbon steel with a stainless steel cladding on the outside, titanium, or titanium alloys; other fabrication materials are also within the scope of the invention.

Mechanical action to physically push solid metal deposits out of the outlet tubes can be achieved using a rod or cylinder with a slightly smaller outer diameter than the inner diameter of the outlet tube(s). For example, the outer diameter of the rod or cylinder may be 0.25 inches to one inch smaller than the inner diameter of the outlet tube(s). This range is illustrative; other values outside of this range are also within the scope of the invention. The rod may be in a cylindrical shape for round outlet tube(s), or may be in the shape of a square or rectangle for outlet tube(s) that are square or rectangular in shape. The rod may be shaped in any way to match the shape of the outlet tube(s). Alternatively, a plunger device having a rod with a disc attached to the end, the disc being shaped in the same shape as the outlet tube(s) and having a slightly smaller outer diameter than the inner diameter of the outlet tube(s), may be used.

An additional method of removing solid metal from the outlet tube(s) is flushing the outlet tube(s) with liquid metal, which would result in melting of the solid metal and removal to the holding tank. To accomplish this, any liquid metal used to flush the outlet tube(s) must be sufficiently hot to melt the solid metal and avoid solidifying as it travels through the outlet tube(s).

An additional method of removing solid metal from the outlet tube(s) is by further cooling the outlet tube(s) to achieve a sufficiently large thermal expansion coefficient difference between the solid metal within the outlet tube(s) and the metal of the outlet tube(s) itself. The large thermal expansion coefficient difference causes the solid metal within the outer tube(s) to peel off of the outlet tube(s). For example, because the thermal expansion coefficient difference between magnesium and steel is large—25 ppm per degree Celsius for magnesium and 12 ppm per degree Celsius for steel—if the outlet tube(s) are made of steel and contains solid magnesium, further cooling of the outlet tube(s) would result in peeling of the magnesium from the inner walls of the outlet tube(s). The peeled magnesium could then be more easily removed using mechanical action or by flushing the outlet tube(s) with liquid metal, as described above.

The holding tank 102 optionally has a lid, cover, or other movable barrier 111 located above the surface of the liquid metal 104 and below the inlet tube(s) 101 and outlet tube(s) 106 to prevent evaporation of the liquid metal 104 contained in the holding tank 102. This optional lid or cover 111 can be used to cover the liquid metal 104 in the holding tank 102 when there is no condensation of liquid metal occurring in the inlet tube(s) 101 and there is only solid metal condensation occurring in the outlet tube(s) 106, which would occur when the partial pressure of the metal vapor in the carrier gas is below its equilibrium vapor pressure at its melting point. This lid or cover 111 is removed when the outlet tube(s) 106 are melting the solid metal to liquid metal or mechanically pushing the solid metal back to the holding tank 102.

One advantage of the features of the embodiments described herein is that the equilibrium vapor pressure of metal at the exit of the outlet tube(s) 106 can be much lower than that at the melting point of the metal, e.g., $10^{-6}$ atm at 350° C. for magnesium, such that this apparatus can recover a larger fraction of the entering metal than would be possible without these features. This apparatus is therefore useful for condensing metal when its entering vapor pressure is well below the 0.7-1.2 atmosphere range, and even when the dew point of the entering metal vapor is below its melting point. It is also robust to fluctuations in input gas stream temperature and metal vapor pressure, such as those found in metallothermic production of magnesium. Another advantage is the ability to operate continuously without shutting off completely to remove condensed solid metal from the outlet tube(s), as some of those tubes can be selectively sealed off during melting, mechanical pushing, or flushing of the metal, while other tubes remain open and condensing more solid metal.

Embodiments of the condenser apparatus are useful not only in conjunction with processes for primary production of metals such as magnesium, such as metallothermic and electrolysis processes, but also for processes which refine magnesium and other metals by distillation and electrorefining, and for other sources of metal vapor.

Figure 3:
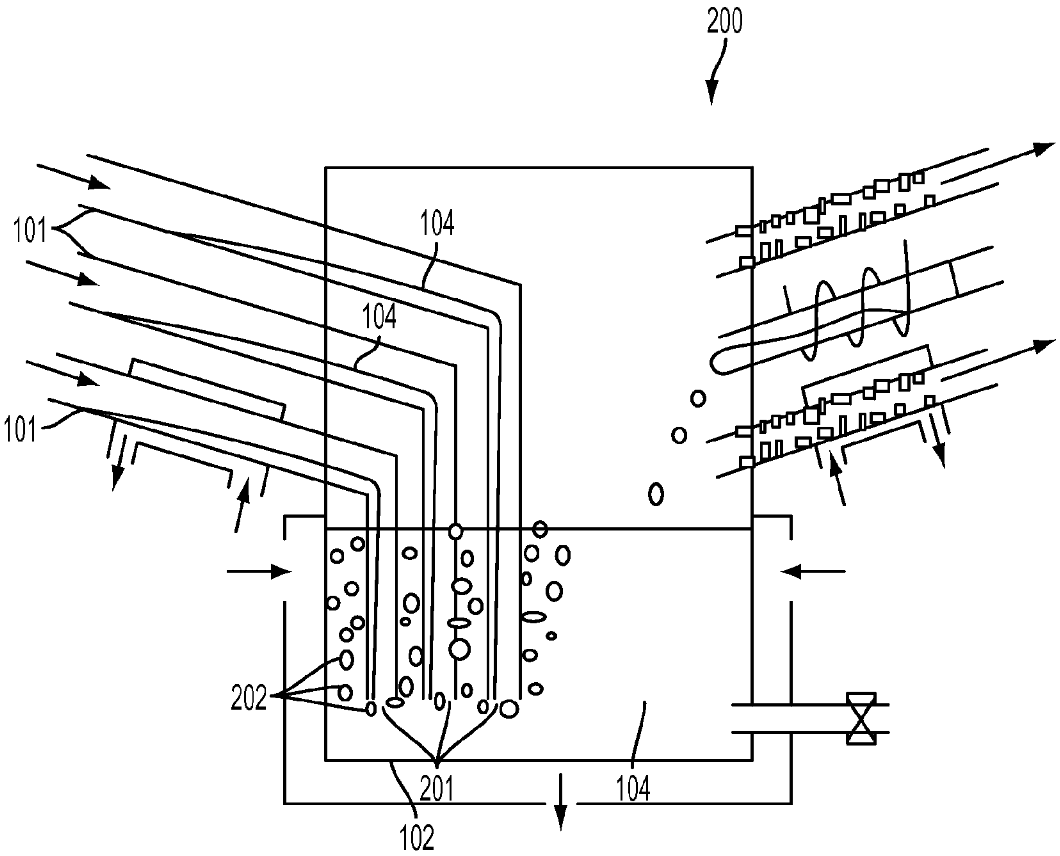
FIG. 3 is a schematic of a second condenser embodiment of the invention.

FIG. 3 illustrates a second embodiment of a condenser system 200 that shares several of the features of condenser system 100 described above. In this second embodiment, the exits 201 of the inlet tube(s) 101 are submerged in the liquid metal 104 in the holding tank 102 such that they produce small bubbles 202 of metal vapor and the carrier gas of less than, e.g., 5 cm diameter, which float to the liquid metal surface. This range is illustrative; other values outside of this range are also within the scope of the invention. Such small bubbles 202 exhibit large surface area, which facilitates rapid gas-liquid heat and mass transfer kinetics, in order to cool the gas and condense some of its remaining metal as a liquid. Gas bubbles also stir liquid metal 104, and in this case the carrier gas stirring the liquid metal 104 in the holding tank 102 can enhance heat transfer in order to keep the liquid metal temperature roughly uniform. As before, the liquid metal temperature should be above the metal's melting point. This stirring can also perform mixing of alloying elements, such as aluminum, manganese, rare-earth metals, and zinc into liquid magnesium, creating a homogeneous alloy. When zinc or other highly volatile metals are present in an alloy, the outlet tube(s) 106 can serve to condense and return any metal which evaporates back into the holding tank 102. In this embodiment, the condensed liquid metal 104 thus serves as a coolant for the submerged portions of the tubes 101 and the gas mixture contained within them.

Figure 4:
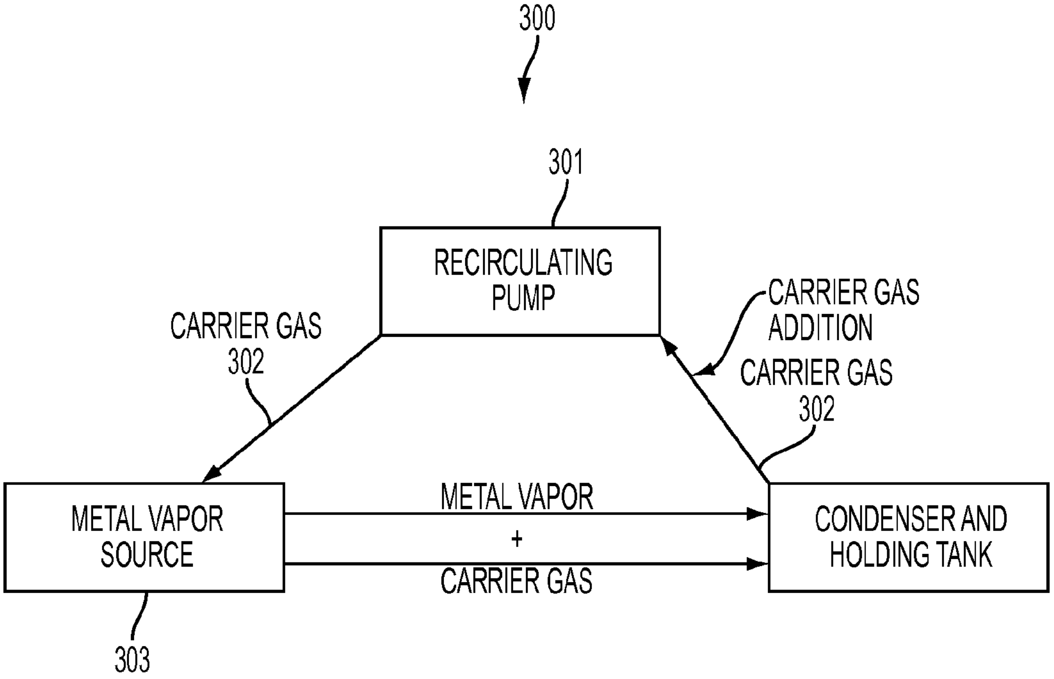
FIG. 4. block diagram of a metal vapor source condenser and holding tank according to a third embodiment of the invention.

FIG. 4 illustrates a third embodiment of a condenser system 300. In this third embodiment, a gas pumping device or recirculating pump 301 recirculates the remaining carrier gas 302, illustratively argon, from the outlet tube(s) exit back into a process chamber of a metal vapor source 303, which generates the magnesium vapor, illustratively the SOM Electrolysis crucible. Optionally, the apparatus can continuously or periodically re-direct this argon through a cold trap in order to remove volatile elements or compounds by condensation; this cold trap is a condenser which cools the argon or other carrier gas, causing some of the volatile elements or other compounds that remain in the gas to condense out of the gas. Although not shown in the figure, the cold trap can be located between the condenser and carrier gas addition. This cold trap may illustratively be cooled by water, liquid nitrogen or argon, other refrigerants, or cold gases; other cooling fluids or devices are also within the scope of this invention. It may also have a heat exchanger such that argon or other carrier gas traveling from the condenser outlet tube(s) to the cold trap both heats and is partially cooled by the argon or other carrier gas returning from the cold trap, in order to reduce the energy or cooling fluid required to maintain the cold trap temperature. It may also include a means to add carrier gas before the recirculating pump 301, which is the lowest-pressure part of the circuit, in order to maintain pressure and replace losses due to leakage. For this embodiment, the very low vapor pressure of metal remaining in the carrier gas 302 after solid metal condensation in the outlet tube(s) helps to prevent metal condensation in the cold trap and/or recirculation pump, which could cause clogging of the trap and/or pump and failure of the pump, and thus can be beneficial to the operation of the recirculating pump 301.

In a fourth embodiment of the invention, which shares many of the features of the previous embodiments of the invention, the outlet tube(s) have multiple melting zones along their length and operate in the following sequence. First, metal vapor enters a first zone of the outlet tube(s) from the holding tank. This first zone is the part of the outlet tube(s) that is closest to the holding tank. This first zone is initially cooled as described above, causing the metal vapor to condense to solid metal. This first zone is then heated as described above, causing the solid metal to melt to liquid metal, which flows back into the holding tank. This heating process creates some metal vapor, which moves further up the outlet tube(s) to a second zone of the outlet tube(s).

This second zone of the outlet tube(s) is initially cooled, causing metal vapor received from the first zone to condense to solid metal. This second zone is then heated, causing the solid metal to melt to liquid metal, which flows back to the first zone of the outlet tube(s) and eventually to the holding tank. This heating process creates some metal vapor, which moves further up the outlet tube(s) to a third zone of the outlet tube(s).

This third zone of the outlet tube(s) is initially cooled, causing metal vapor received from the second zone to condense to solid metal. This third zone is then heated, causing the solid metal to melt to liquid metal, which flows back to the second zone of the outlet tube(s) and eventually back to the first zone of the outlet tube(s) and to the holding tank. This heating process creates some metal vapor, which moves further up the outlet tube(s) to additional zones.

As described above, an optional gas flow cutoff valve is located at the distal end of the outlet tube(s). This gas flow cutoff valve is open during this process, allowing carrier gas to exit the outlet tube(s). To clear out the solid metal from the last zone of the outlet tube(s) without allowing metal vapor to escape from the outlet tube(s), the gas flow cutoff valve is closed and the last zone is subsequently heated, causing the solid metal in the last zone to melt to liquid metal, which flows back to the previous zone. Because the gas flow cutoff valve is closed, any metal vapor that is created by the heating process remains in the outlet tube(s). The last zone of the outlet tube(s) is then re-cooled, and the gas flow cutoff valve is opened. Alternatively, multiple zones can be simultaneously heated during this process.

In this fourth embodiment, each additional zone reduces the amount of metal vapor which exits the condenser, and/or reduces the downtime required for a given limitation on the amount of metal vapor exiting the condenser. That is, if operating continuously with one zone periodically melting results in a time-averaged fraction a of metal exiting the condenser during its heating time (for example, it heats and melts metal one tenth of the time, resulting in one tenth of the metal entering the second condenser tube, so a=0.1), then two zones can theoretically reduce the metal exit loss to $a^2$ (in this example $a^2$=0.01 so 99% of the metal is retained), and three zones would reduce it to $a^3$, and so on. Or if operating with one zone periodically melting results in a fraction of the time b in which the carrier gas flow is shut off (for example, it heats and melts metal without carrier gas flow one tenth of the time, resulting in one tenth downtime, so b=0.1), then operating with two zones can theoretically reduce downtime to $b^2$ (in this example, $b^2$=0.01 so the process achieves 99% uptime), three zones would reduce it further to $b^3$, and so on.

Figure 5:
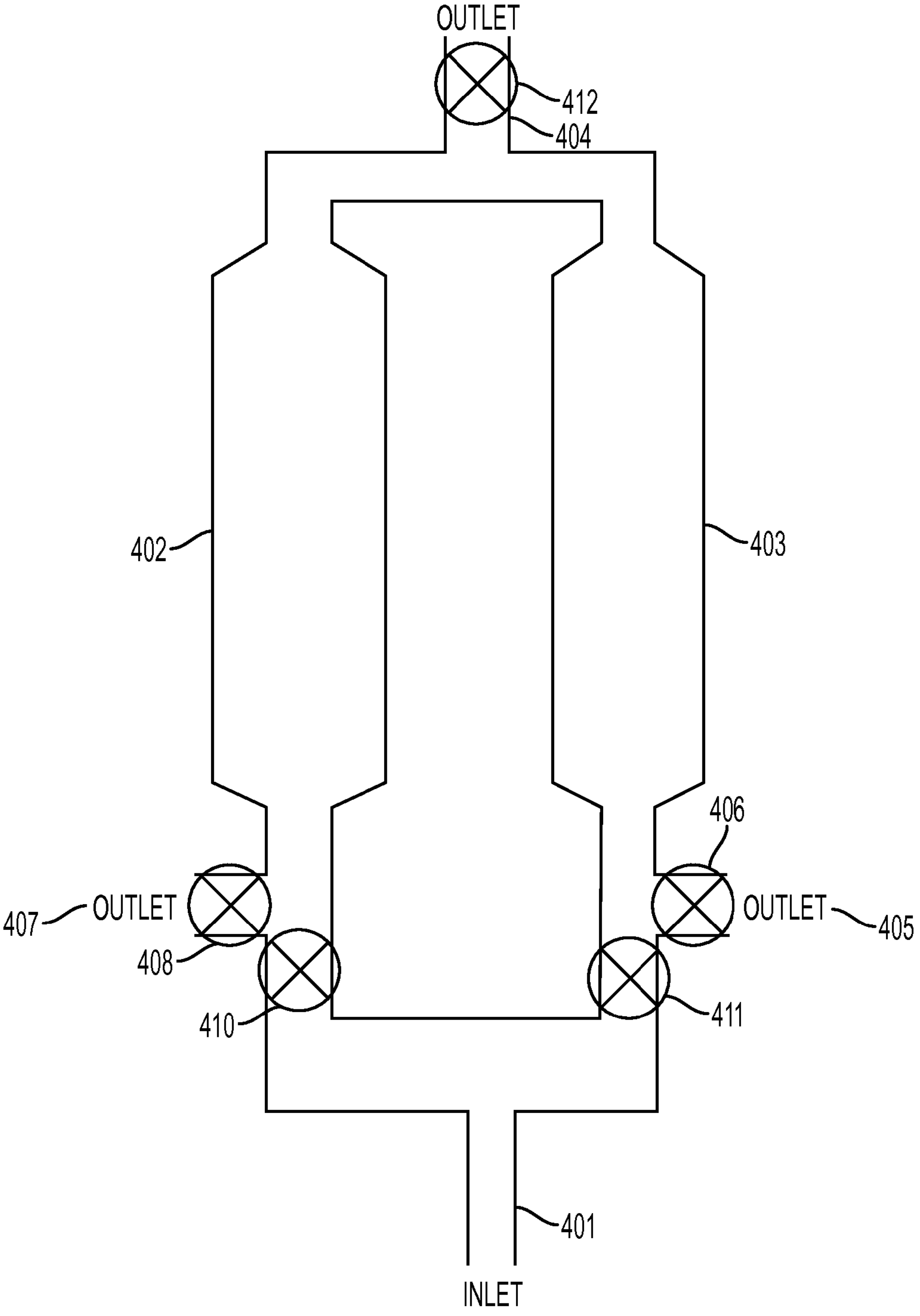
FIG. 5 is a schematic of a fifth condenser embodiment of the invention.
Figure 6:
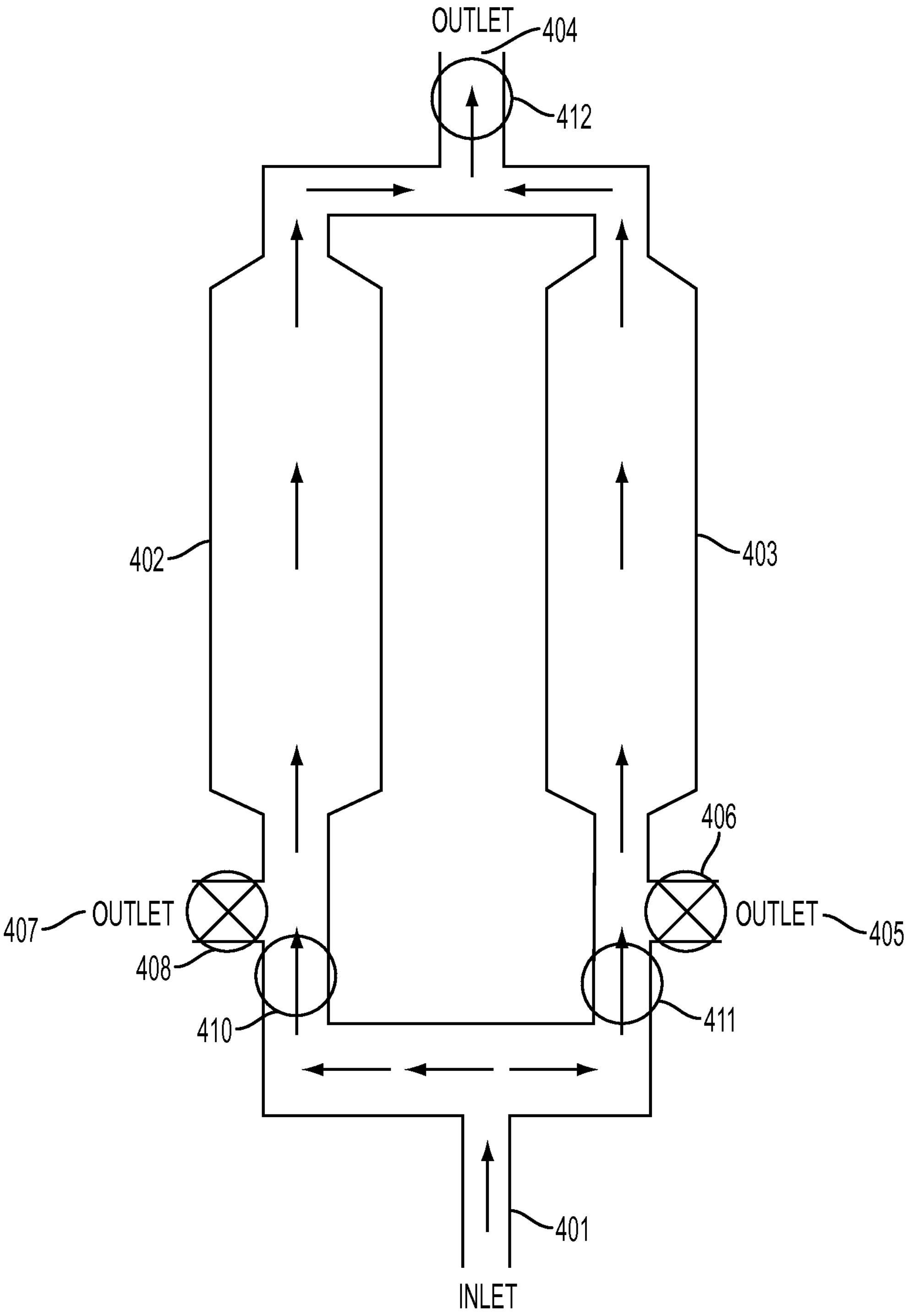
FIG. 6 is a schematic of a fifth condenser embodiment of the invention during normal operation of the condenser.
Figure 7:
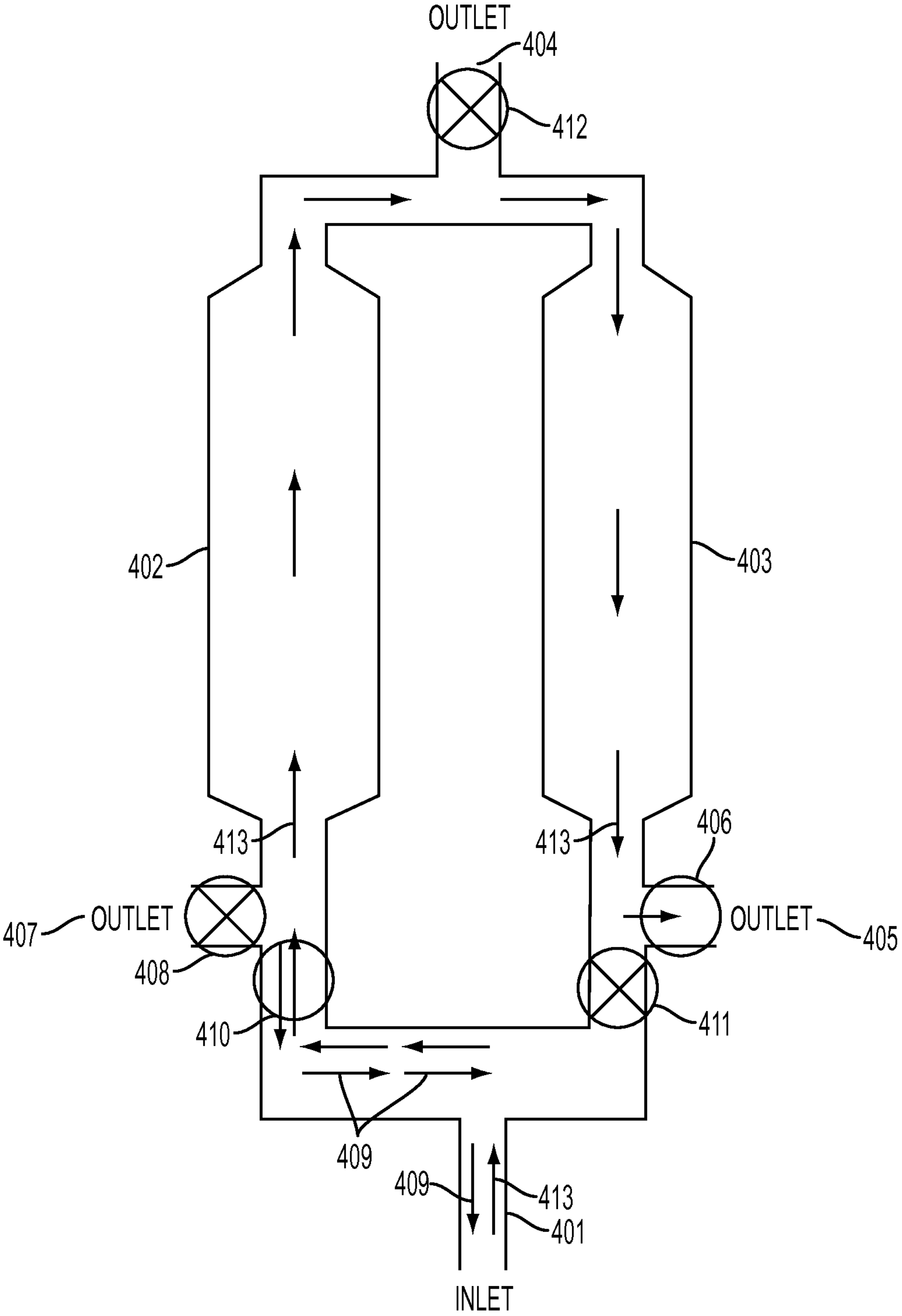
FIG. 7 is a schematic of a fifth condenser embodiment of the invention during operation of the condenser to melt solid metal deposits in the condenser.

In a fifth embodiment of the invention, shown in FIGS. 5-7, a parallel system of outlet tubes allows for continuous metal vapor and carrier gas flow through the condenser without having to close off the flow for any period of time. FIG. 5 shows the parallel system of outlet tubes, with an inlet 401 for receiving metal vapor and carrier gas from the holding tank, a left condenser tube 402 and a right condenser tube 403 for condensing metal vapor to solid metal, a main exhaust 404 for exhausting carrier gas, a main exhaust outlet valve 412, a right outlet exhaust 405 and a left outlet exhaust 407 for exhausting carrier gas, and a right outlet valve 406 and a left outlet valve 408. The left condenser tube 402 also has a left condenser tube inlet valve 410 and a right condenser tube inlet valve 411 which are located proximal to the inlet 401.

FIG. 6 shows the parallel outlet tube system in parallel operation. Remaining metal vapor and carrier gas flows from the holding tank in to inlet 401 and subsequently in to left condenser tube 402 and right condenser tube 403, which are both connected to inlet 401. The left and right condenser tubes 402 and 403 are cooled by fluid jackets or other cooling means, which cool the vapor and gas to well below metal's melting point, condensing nearly all of the remaining metal as solids. The carrier gas subsequently flows out of the condenser through the main outlet 404.

FIG. 7 shows the mechanism by which the solid metal is melted and collected in the holding tank. The main outlet valve 412 is closed, the right condenser tube outlet valve 406 is opened, and the right condenser tube inlet valve 411 is closed. This causes the remaining metal vapor and carrier gas 413 to flow from the holding tank through inlet 401, through the left condenser tube 402, through the right condenser tube 403, and out the right condenser tube outlet 405. The left condenser tube 402 is then heated above the metal's melting point, causing the solid metal in the left condenser tube 402 to melt, and the resulting liquid metal 409 to flow back through inlet 401 in to the holding tank. Any metal vapor that results from this heating process is carried to the right condenser tube 403, where it is re-condensed to solid metal. After this process is allowed to run for some time, the left condenser tube 402 is cooled below the metal's melting point.

The right condenser tube outlet valve 406 is then closed, the right condenser tube inlet valve 411 is opened, the left condenser tube outlet valve 408 is opened, and the left condenser tube inlet valve 410 is closed. This causes the remaining metal vapor and carrier gas to flow from the holding tank through inlet 401, through the right condenser tube 403, through the left condenser tube 402, and out the left condenser tube outlet 407. The right condenser tube 403 is then heated above the metal's melting point, causing the solid metal in the right condenser tube 403 to melt, and the resulting liquid metal to flow back through inlet 401 in to the holding tank. Any metal vapor that results from this heating process is carried to the left condenser tube 402, where it is re-condensed to solid metal. After this process is allowed to run for some time, the right condenser tube 403 is cooled below the metal's melting point. The condenser system is then returned to its standard operating state by closing left condenser tube outlet valve 408, opening left condenser tube inlet valve 410, and opening main outlet valve 412.

In certain of the embodiments described above, the various heaters, cooling device, valves, pumps, and other system elements are controlled by a process control system or controller (e.g. controller 112 of FIG. 2), such as any known in the art. For example, the control elements (heater, coolers, valves, etc.) can be connected to a Distributed Control System (DCS), Programmable Logic Controller (PLC), or other types of process automation equipment. The controller contains logic that modulates the valves to obtain the desired flow path through the various conduits of the condenser systems. In addition, the controller cycles the heaters and cooling devices (in the case of on/off devices) and/or modulates the heating and or cooling to obtain the desired temperature ranges.

The control system, logic, and/or operation of the various equipment disclosed herein may be implemented as a computer program product with associated database(s) for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to certain embodiments of the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In one experiment conducted using an embodiment of the invention, magnesium vapor entered a condenser system at approximately 1000 degrees Celsius and was cooled to about 750 degrees Celsius in an inlet tube, causing some of the magnesium vapor to condense to liquid magnesium. The remaining magnesium vapor and carrier gas was directed to cooled outlet tubes that were cooled to 150 degrees Celsius, according to the invention. The gas that was exhausted from these outlet tubes contained no measurable amount of magnesium.

In another planned series of experiments using an embodiment of the invention, metal vapor and carrier gas will be condensed to liquid metal in an inlet tube, the liquid metal will be collected in a holding tank, and the remaining metal vapor and carrier gas will enter a series of two outlet tubes that are connected in series and cooled. In one experiment, the first outlet tube which is connected to the holding tank will be periodically heated to melt the solid metal, which will flow back to the holding tank, or a mechanical device will be used to push the condensed solid metal back to the holding tank. The second outlet tube, which is connected to the distal end of the first outlet tube, will not be heated. At the end of the experiment, the first and second outlet tubes will weighed to determine the amount of solid metal in the two tubes. We anticipate that the additional mass of metal will be less than 1% of the mass of the metal in the holding tank. In a second experiment, the first and second outlet tubes will be cooled continuously. At the end of the experiment, the first and second outlet tubes will be weighed to determine the amount of solid metal in the two tubes. We anticipate that the additional mass of metal will be approximately 4% to 5% of the mass of the metal in the holding tank. We anticipate that this series of experiments will show the effectiveness of a two-stage condenser.

It would be readily apparent to those skilled in the art that the condenser apparatuses described herein can be used with numerous metals other than magnesium, including, inter alia, calcium, copper, zinc, sodium, potassium, lithium, and samarium.

Other embodiments are within the scope of the following claims. Several embodiments of the claimed invention have been shown, for example, in FIGS. 1-7, but other embodiments exist that would also fall within the scope of the claims. The description above is illustrative; the invention is defined by the following claims.

What is claimed is:

1. An apparatus for condensing metal vapors comprising:

at least one inlet conduit for receiving a mixture of metal vapor and carrier gas;

a holding tank for liquid metal operatively connected to the at least one inlet conduit for receiving the mixture of metal vapor and carrier gas from the at least one inlet conduit;

at least one outlet conduit operatively connected to the holding tank for receiving the mixture of metal vapor and carrier gas from the holding tank;

at least a first cooling device operatively connected to the at least one outlet conduit to cause at least a portion of the metal vapor entering the at least one outlet conduit to condense to solid metal;

at least one heater operatively connected to the at least one outlet conduit for causing at least a portion of the solid metal to melt and subsequently flow in to the holding tank; and at least one sealing mechanism located at a distal end of the at least one outlet conduit for sealing the distal end of the at least one outlet conduit and preventing remaining metal vapor and carrier gas from exiting the distal end of the outlet conduit when the outlet conduit is being heated.

2. The apparatus of claim 1, further comprising at least a second cooling device operatively connected to the at least one inlet conduit to cause at least a portion of the metal vapor entering the at least one inlet conduit to condense to liquid metal.

3. The apparatus of claim 1, further comprising at least one of a heater for heating the holding tank and a cooling device for cooling the holding tank.

4. The apparatus of claim 1, wherein the at least one inlet conduit is partially submerged in the liquid metal in the holding tank.

5. The apparatus of claim 1, further comprising a movable barrier within the holding tank, the barrier being movable between a first closed position for preventing metal vapor from liquid metal in the holding tank from entering the at least one outlet conduit and a second open position for permitting melted solid metal from the outlet conduits to enter the holding tank.

6. The apparatus of claim 1, further comprising a controller for controlling the at least one first cooling device, the at least one heater, and the at least one sealing mechanism, wherein the controller causes:

the at least one first cooling device to cool and condense the metal vapor inside the at least one outlet conduit to solid metal;

subsequent to the operation of the at least one first cooling device, the at least one heater to heat and melt the solid metal inside the at least one outlet conduit; and the at least one sealing mechanism to seal the distal end of the at least one outlet conduit while the at least one heater is heating the at least one outlet conduit.

7. The apparatus of claim 1, further comprising:

a source of the mixture of metal vapor and carrier gas; and a gas pumping device operatively connected to the at least one outlet conduit and to the source of the mixture of metal vapor and carrier gas, to pump remaining metal vapor and carrier gas that is exhausted from the at least one outlet conduit to the source of the mixture of metal vapor and carrier gas.

8. The apparatus of claim 7, further comprising a gas pump input conduit that is operatively connected to the at least one outlet conduit and the gas pumping device, and a source of additional carrier gas that is operatively connected to the gas pump input conduit.

9. The apparatus of claim 7, further comprising at least one cold trap device operatively connected to the gas pumping device to cool the remaining metal vapor and carrier gas in order to condense and reduce any amounts of at least one of volatile elements and compounds present in the remaining metal vapor and carrier gas mixture.

10. An apparatus for condensing metal vapors comprising:

at least one inlet conduit for receiving a mixture of metal vapor and carrier gas;

a holding tank for liquid metal operatively connected to the at least one inlet conduit for receiving the mixture of metal vapor and carrier gas from the at least one inlet conduit;

at least one outlet conduit operatively connected to the holding tank for receiving the mixture of metal vapor and gas from the holding tank, the at least one outlet conduit having a proximal end located proximal to the holding tank and a distal end located distal to the holding tank, the at least one outlet conduit having a plurality of sections;

a plurality of cooling devices operatively connected to the corresponding plurality of sections of the at least one outlet conduit to cause some of the metal vapor inside the corresponding section of the at least one outlet conduit to condense to solid metal;

a plurality of heaters operatively connected to the corresponding plurality of sections of the at least one outlet conduit to cause the solid metal within the corresponding section of the at least one outlet conduit to melt; and a controller for controlling the plurality of cooling devices and the plurality of heaters, wherein the controller causes:

a first cooling device of the plurality operatively connected to a first section of the at least one outlet conduit to cool and condense the metal vapor inside the first section of the at least one outlet conduit to solid metal;

subsequent to the operation of the first cooling device, a first heater of the plurality operatively connected to the first section of the at least one outlet conduit to heat and melt the solid metal inside the first section of the at least one outlet conduit;

a second cooling device of the plurality operatively connected to a second section of the at least one outlet conduit to cool and condense the metal vapor inside the second section of the at least one outlet conduit to solid metal; and subsequent to the operations of the second cooling device, a second heater of the plurality operatively connected to the second section of the at least one outlet conduit to heat and melt the solid metal inside the second section of the at least one outlet conduit.

11. The apparatus of claim 10, wherein the controller further causes:

a third cooling device of the plurality operatively connected to a third section of the at least one outlet conduit to cool and condense the metal vapor inside the third section of the at least one outlet conduit to solid metal; and subsequent to the operation of the third cooling device, a third heater operatively connected to the third section of the at least one outlet conduit to heat and melt the solid metal inside the third section of the at least one outlet conduit.

12. The apparatus of claim 10, further comprising at least a first cooling device operatively connected to the at least one inlet conduit to cause at least a portion of the metal vapor entering the at least one inlet conduit to condense to liquid metal.

13. The apparatus of claim 10, further comprising at least one sealing mechanism located at the distal end of the at least one outlet conduit for sealing the distal end of the at least one outlet conduit and preventing remaining metal vapor and carrier gas from exiting the distal end of the at least one outlet conduit, wherein the controller further causes the at least one sealing mechanism to seal the distal end of the at least one outlet conduit when the heater operatively connected to the distal most section of the at least one outlet conduit heats the corresponding conduit section.

14. The apparatus of claim 10, further comprising at least one of a heater for heating the holding tank and a cooling device for cooling the holding tank.

15. The apparatus of claim 10, wherein the at least one inlet conduit is partially submerged in the liquid metal in the holding tank.

16. The apparatus of claim 10, further comprising a movable barrier within the holding tank, the barrier being movable between a first closed position for preventing metal vapor from liquid metal in the holding tank from entering the at least one outlet conduit and a second open position for permitting melted solid metal from the outlet conduits to enter the holding tank.

17. The apparatus of claim 10, further comprising:

a source of the mixture of metal vapor and carrier gas; and a gas pumping device operatively connected to the at least one outlet conduit and to the source of the mixture of metal vapor and carrier gas, to pump remaining metal vapor and carrier gas that is exhausted from the at least one outlet conduit to the source of the mixture of metal vapor and carrier gas.

18. The apparatus of claim 17, further comprising a gas pump input conduit that is operatively connected to the at least one outlet conduit and the gas pumping device, and a source of additional carrier gas that is operatively connected to the gas pump input conduit.

19. The apparatus of claim 17, further comprising at least one cold trap device operatively connected to the gas pumping device to cool the remaining metal vapor and carrier gas mixture in order to condense and reduce the amount of at least one of volatile elements and compounds present in the metal vapor and carrier gas mixture.

20. An apparatus for condensing metal vapors comprising:

at least one inlet conduit for receiving a mixture of metal vapor and carrier gas;

a holding tank for liquid metal operatively connected to the at least one inlet conduit for receiving the mixture of metal vapor and carrier gas from the at least one inlet conduit;

at least one outlet conduit operatively connected to the holding tank for receiving the mixture of metal vapor and carrier gas from the holding tank;

at least a first cooling device operatively connected to the at least one outlet conduit to cause at least a portion of the metal vapor entering the at least one outlet conduit to condense to solid metal;

and at least one mechanical device positioned inside the at least one outlet conduit that operates to push the solid metal from the at least one outlet conduit to the holding tank.

21. The apparatus of claim 20, further comprising at least a second cooling device operatively connected to the at least one inlet conduit to cause at least a portion of the metal vapor entering the at least one inlet conduit to condense to liquid metal.

22. The apparatus of claim 20, further comprising further cooling the at least one outlet conduit to cause the solid metal inside the at least one outlet conduit to compress faster than the at least one outlet conduit and separate from the surface of the at least one outlet conduit.

23. The apparatus of claim 20, further comprising at least one of a heater for heating the holding tank and a cooling device for cooling the holding tank.

24. The apparatus of claim 20, wherein the at least one inlet conduit is partially submerged in the liquid metal in the holding tank.

25. The apparatus of claim 20, further comprising a controller for controlling the at least one first cooling device and the at least one mechanical device.

26. The apparatus of claim 20, further comprising a movable barrier within the holding tank, the barrier being movable between a first closed position for preventing metal vapor from liquid metal in the holding tank from entering the at least one outlet conduit and a second open position for permitting melted solid metal from the outlet conduits to enter the holding tank.

27. The apparatus of claim 20, further comprising:
a source of the mixture of metal vapor and carrier gas; and
a gas pumping device operatively connected to the at least one outlet conduit and to the source of the mixture of metal vapor and carrier gas, to pump remaining metal vapor and carrier gas that is exhausted from the at least one outlet conduit to the source of the mixture of metal vapor and carrier gas.

28. The apparatus of claim 27, further comprising a gas pump input conduit that is operatively connected to the at least one outlet conduit and the gas pumping device, and a source of additional carrier gas that is operatively connected to the gas pump input conduit.

29. The apparatus of claim 27, further comprising at least one cold trap device operatively connected to the gas pumping device to cool the remaining metal vapor and carrier gas mixture in order to condense and reduce the amount of at least one of volatile elements and compounds present in the metal vapor and carrier gas mixture.

30. An apparatus for condensing metal vapors comprising:
at least one inlet conduit for receiving a mixture of metal vapor and carrier gas;
a holding tank for liquid metal operatively connected to the at least one inlet conduit for receiving the metal vapor and carrier gas from the at least one inlet conduit;
at least one set of outlet conduits operatively connected to the holding tank for receiving the metal vapor and gas mixture from the holding tank, each outlet conduit of the set having a shared input section and a shared output section, and each outlet conduit of the set having an individual output section;
a set of cooling devices, each being operatively connected to a corresponding outlet conduit to cause some of the metal vapor inside the outlet conduit to condense to solid metal;
a set of heaters, each heater being operatively connected to a corresponding outlet conduit to cause the solid metal inside the outlet conduit to melt;
a plurality of valves operatively connected to the set of outlet conduits; and
a controller for controlling the set of cooling devices, the set of heaters, and the plurality of valves to cause the metal vapor and gas mixture to pass from the shared input section through the set of outlet conduits in parallel to the shared output section when each of the set of cooling devices is condensing solid metal in each of the corresponding outlet conduits, and to cause the metal vapor and gas mixture to pass from the shared input section through the set of outlet conduits in series to the individual output section of an outlet conduit of the set in which a corresponding cooling device is condensing solid metal when a heating device of the set is melting solid metal in the other outlet conduit of the set.

31. The apparatus of claim 30, further comprising at least a first cooling device operatively connected to the at least one inlet conduit to cause at least a portion of the metal vapor entering the at least one inlet conduit to condense to liquid metal.

32. The apparatus of claim 30, further comprising a movable barrier within the holding tank, the barrier being movable between a first closed position for preventing metal vapor from liquid metal in the holding tank from entering the at least one set of outlet conduits and a second open position for permitting melted solid metal from the set of outlet conduits to enter the holding tank.

* * * * *